July 28, 1936.  J. H. HARDY  2,049,392
AIR DELIVERY DEVICE
Filed Dec. 13, 1933  2 Sheets-Sheet 1
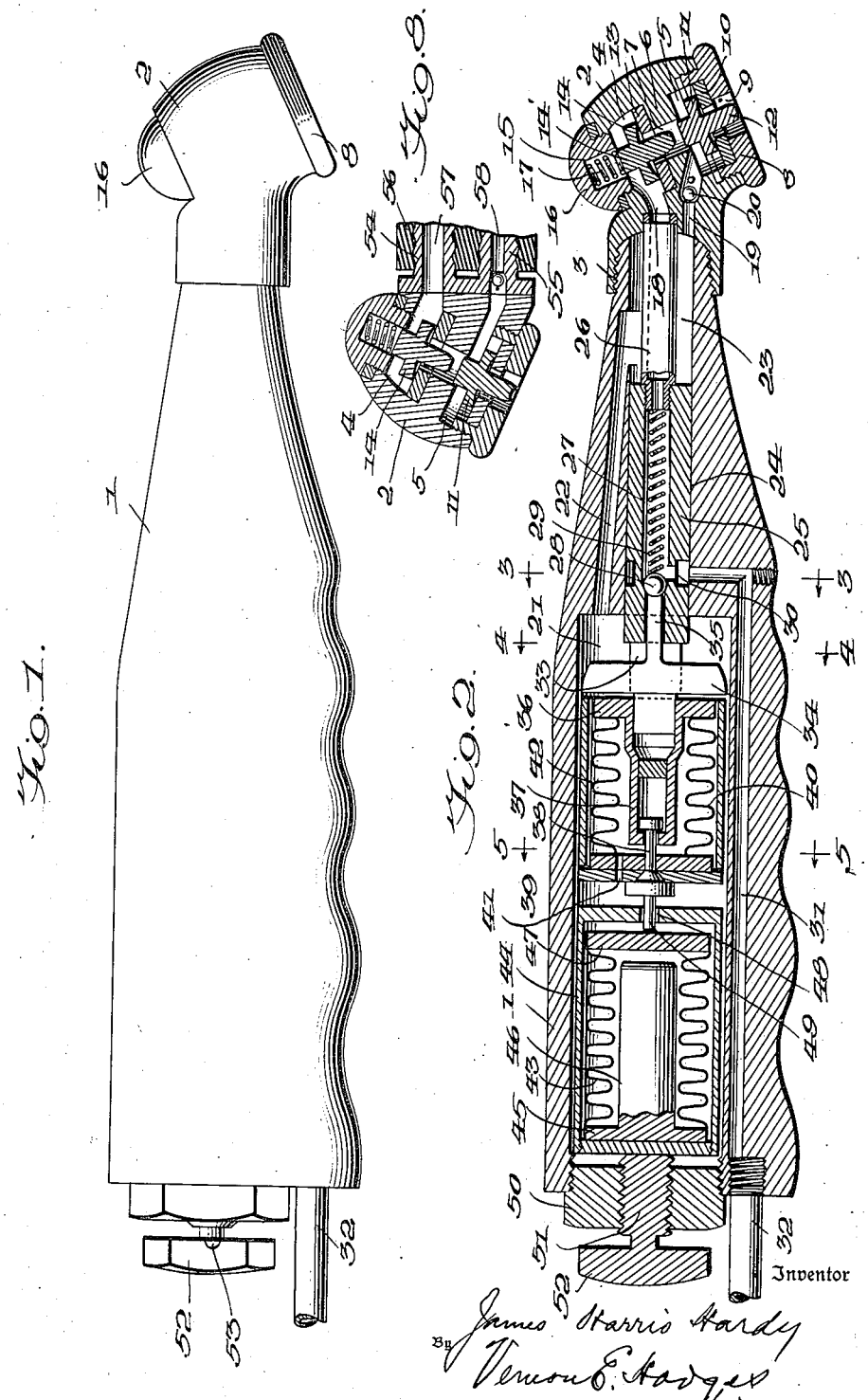

July 28, 1936. J. H. HARDY 2,049,392
AIR DELIVERY DEVICE
Filed Dec. 13, 1933 2 Sheets-Sheet 2
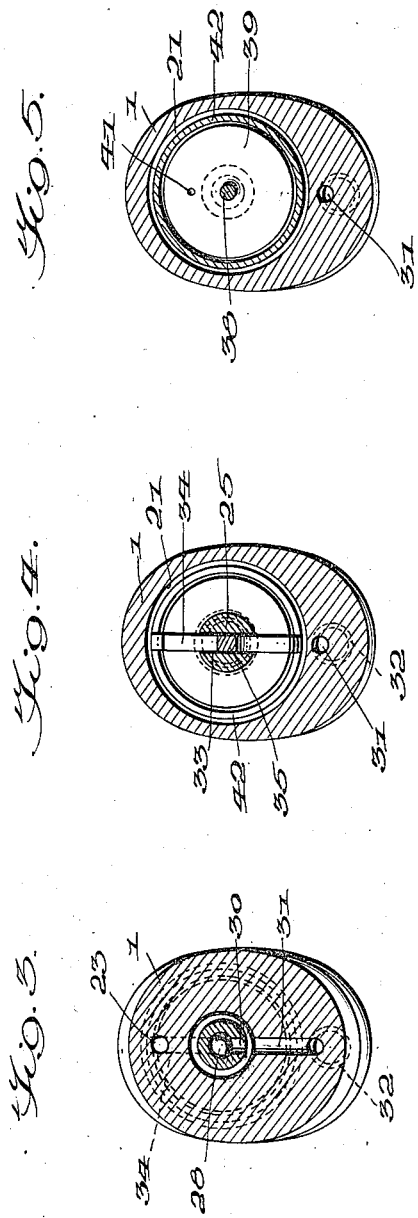
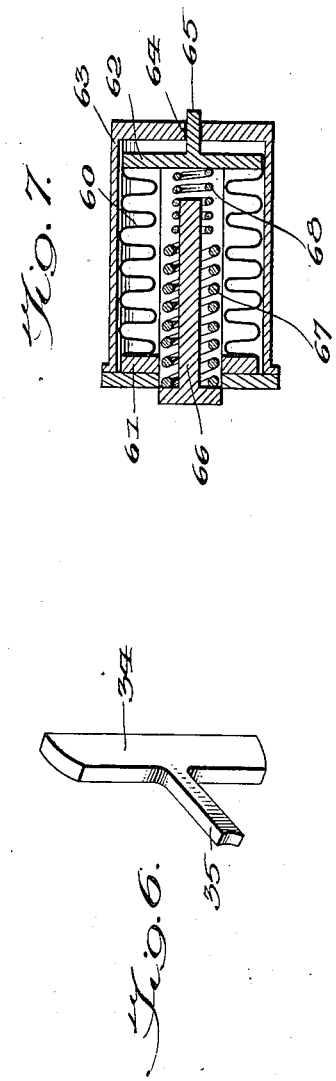
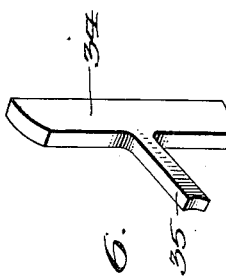
James Harris Hardy Inventor
Vernon E. Hodges
his Attorney Patented July 28, 1936

2,049,392

UNITED STATES PATENT OFFICE 2,049,392

AIR DELIVERY DEVICE

James Harris Hardy, Columbus, Miss., assignor to Precision Air Gauge Company, Columbus, Miss., a corporation of Mississippi Application December 13, 1933, Serial No. 702,239

10 Claims. (Cl. 50—4)

This invention relates to an improvement in air-delivery gauges, such as may be employed for the inflation of pneumatic tires.

The object of the invention is to provide a gauge for controlling the inflation of a pneumatic tire for instance, which will deliver a predetermined pressure thereto, so as to inflate the tire to the desired pressure and to automatically stop the inflation when that pressure is reached.

A further object of the invention is to provide a nozzle for inflating a pneumatic tire capable of delivering high or low pressure to the tire, at the will of the operator. The nozzle is adapted to be connected with a source of high pressure, and under the control of the operator, this high pressure may be connected directly with the tire for speedy inflation thereof. A source of low pressure may be connected with the nozzle, so as to be used to inflate the tire, as for instance, when the tire is inflated to almost normal pressure. The low pressure connection may be through the pressure gauge, if desired, or direct with a source of low pressure.

In the accompanying drawings,

Fig. 1 is a side elevation of the air delivery gauge with the nozzle applied thereto;

Fig. 2 is a longitudinal sectional view therethrough;

Fig. 3 is a transverse sectional view through the gauge on the line 3—3, of Fig. 2;

Fig. 4 is a similar view on the line 4—4, of Fig. 2;

Fig. 5 is a similar view on the line 5—5, of Fig. 2;

Fig. 6 is a perspective view of the check-valve opener;

Fig. 7 is a longitudinal sectional view through a modified form of regulating bellows; and Fig. 8 is a sectional view through the nozzle with direct high and low pressure connections.

As shown in Figs. 1 and 2, the assembly comprises a casing 1 of a size and shape that it may be gripped in the hand of an operator and has a head 2 of a nozzle connected therewith, as by screw-threads 3, the connection being tightly packed, so as to prevent the escape of air therethrough.

The head 2 of the nozzle has high and low pressure chambers 4 and 5 therein, separated by a wall 6 having an opening 7 therethrough. The chamber 5 is partly closed at its lower side by means of a cap 8, provided with a central opening 9 therethrough, of a size and shape adapted to receive the upper end of the valve stem of a pneumatic tire. The cap 8 supports a valve seat 10 on its upper side which is preferably of rubber and against which seats a low pressure valve 11 having a stem 12, projecting in opposite directions from said valve and being guided by the openings 7 and 9, but being of smaller size than said openings, so as to allow the flow of fluid therethrough around the stem.

A rubber or resilient valve seat 13 is mounted in the chamber 4 in position to receive a high pressure valve 14 having its valve stem 14' projecting in opposite directions, one portion being received in the opening 7 and the other portion being received in an opening 15 in a plug 16 which seals the outer side of the chamber 4. A spring 17 is mounted in the opening 15 and bears against the valve 14 normally tending to hold it on its seat.

The head 2 has a high pressure passageway 18 therethrough and a low pressure passageway 19, the latter being controlled by a check-valve 20.

The casing 1 has a chamber 21 therein having a duct 22 extending therefrom to an air passageway 23 in its outer end which communicates with the low pressure passageway 19. An opening 24 in the casing 1 besides the passageway 22 has a stem 25 fitted therein and carrying a tube 26 communicating with the bore 27 of the stem 25 and also with the passageway 18 of the high pressure valve. The bore 27 has communication therethrough in one direction controlled by a check-valve 28, normally held against its seat by a spring 29. An orifice 30 through one side of the stem 25 communicates with a passageway 31 extending through the casing 1 to be connected with a high pressure pipe 32.

The stem 25 has the inner end portion thereof slotted as at 33 and receives a T-shaped member 34 having a finger 35 projecting into the bore 27 in position to engage the ball check-valve 28, to unseat the same.

Fitted on the extreme inner end portion of the tube 25 and supported thereby is a head 36 having a tubular stop member 37, connected therewith receiving a headed pin 38, attached to a head 39 of an expansion bellows 40. The bellows 40 normally has a tendency to expand but it may be contracted by pressure being applied to the head 39. The inward movement of the head 39 is limited by the end of the tubular stop member 37 and the expansion of the bellows is limited by the headed pin 38.

The head 39 has an orifice 41 therethrough into the bellows 40 to permit the leakage of fluid pressure therein for equalizing the pressure inside and outside of the bellows. A sleeve 42 surrounds the holding bellows 40 and is adapted to be moved lengthwise by the head 39 but surrounds the periphery of the head 36 to move thereover and to engage and move the T-shaped member 34 to unseat the check-valve 28.

A regulating bellows 43 is mounted in the chamber 21 of the casing being surrounded by a cover 44, to one end of which is fixed a head 45 for the bellows 43 and which head carries a stop member 46 projecting toward the companion head 47 of the bellows which is movable relative to the cover 44. The cover 44 has an orifice 48 through the outer end thereof, in which orifice a pin 49 is mounted slidably and adapted to be forced outward by expansion of the bellows. The pin 49 is adapted to engage the head 39 of the holding bellows 40 in order to move said head inward.

The bellows 40 and 43 are preferably constructed of resilient metallic material, so corrugated as to have a tendency to expand and the opposite ends of these bellows are sealed to the heads. The regulating bellows 43 contains a normally fixed internal pressure.

The cover 44 and its orifice 48 diverts the high pressure air long enough to allow action on the holding bellows.

The outer end of the chamber 21 is closed by a plug 50 threaded into and sealed to the casing and through which an adjusting pin 51 is threaded in position to bear against one end of the cover 44, so as to adjust the position of the cover in the chamber 21. The pin 51 is provided with a head 52 having a pointer 53 thereon, to cooperate with a dial represented on the end of the plug 50 to indicate the extent of adjustment of the pin 51 and which adjustment varies the pressure delivered by the gauge.

When the pin 51 is set for thirty pounds pressure, for instance, and the head 2 is pressed on the stem of the tire, if the tire pressure is below thirty pounds, the pressure in the chamber 21 will flow into the tire, lowering the pressure in the chamber 21 which allows the pressure in the cover 44 to be reduced and permits expansion of the regulating bellows 43 sufficient so that its head 47 pushes the pin 49 and the head 39 of the bellows 40 inwardly. Inward movement of the head 39 moves the sleeve 42 sufficient to press the T-shaped member 34 outwardly to unseat the valve 28, allowing the high pressure from the passageway 31 to flow into the chamber 21, which first presses against the head 39 to cause the check valve 28 to be opened still further and then by gradual seeping of the pressure through the reduced orifices 41 and 48 into the bellows 40 and the cover 44, it causes the bellows 40 to expand and the bellows 42 to contract sufficiently so that the T-shaped member 34 is moved back from pressing against the check-valve 28 and allows the spring 29 to close the check-valve cutting off the pressure. The additional pressure in the chamber 21 also flows into the tire to increase its pressure.

If the tire pressure should still be below the set point, say thirty pounds, the operation will be repeated, delivering another volume of pressure to the tire and this continues until the tire pressure is raised to a predetermined amount according to the setting of the pin 51.

If the operator presses strongly on the head 2, the valve stem which normally unseats the valve 11 by engagement with the stem 12 would cause movement of the stem 12 sufficiently to engage the lower end of the stem 14' to unseat the valve 14 allowing the high pressure from the passageway 31 to be communicated through the opening 27, the tube 26 and the passageway 18, and through the opening 7, directly to the valve. This may be used when the pressure of the tire is greatly below the desired pressure or when it contains very little or no pressure, and then when the pressure rises approximately to normal, the operator may lift the head slightly sufficiently to allow the valve 14 to close and thereafter the pressure will be applied through the gauge as above described.

In Fig. 8, I have shown the head as being connected with a double hose for high and low pressure extending directly to separate sources of supply instead of through the gauge.

The construction of the nozzle is the same as shown in Fig. 2, as described above, but the head has tubes 54 and 55 attached to one side thereof communicating respectively with the passageways 18 and 19, and having a hose 56 connected therewith with openings 57 and 58 communicating with the tubes 54 and 55, respectively. If desired, two separate hoses may be used instead of the single double hose 56. The openings 57 and 58 are adapted to be connected with separate source of high and low pressure, respectively, so that when light pressure is applied to the nozzle by the operator, the low pressure is connected with the stem of the tire, whereas when heavy pressure is applied by the operator both valves are unseated and the high pressure is connected to the tire.

In Fig. 7, I have shown a modified form of regulating bellows assembly using spring resistance inside the bellows instead of trapped air resistance. The bellows is designated 60 and has a head 61 at one end adapted to be fixed and a movable head 62 at its opposite end, the bellows and heads being enclosed within a cover 63 normally air-tight, except for orifice 64 within which is disposed a pin 65, the orifice being slightly larger than the pin permitting leakage of air into the cover 63.

A guide 66 is attached to one end of the cover 63, which guide receives coil springs 67 and 68, of different degrees of resilience to give the proper resistances to the regulating bellows 60 in order to normally tend to expand the bellows except when air pressure leaks into the cover 63, sufficient to move its head 62, inwardly.

I claim,

1. An air delivery gauge comprising a casing having a chamber therein provided with a fluid discharge opening, a normally closed valve arranged to control the admission of fluid under pressure to the chamber, a bellows mounted in the chamber and having a fixed end portion and a movable end portion responsive to the withdrawal of fluid from the chamber, means actuated by expansion of the bellows upon withdrawal of the fluid from the chamber for opening the valve and admitting fluid under pressure to the chamber, and a cover enclosing the bellows and having a relatively reduced opening therethrough for the admission of fluid under pressure from the chamber to the exterior of the bellows.

2. An air delivery gauge comprising a casing having a chamber therein provided with a fluid discharge opening, a stem in the casing having a fluid admission passageway to the chamber, a normally closed valve for controlling the passage of fluid through said passageway, said stem having a slot therein, a valve opener mounted in the slot and having a projection in position to open the valve, a bellows having an end portion attached to the stem and the opposite end portion movable in response to the withdrawal of fluid from the chamber, and a sleeve actuated by the movable end portion and in position to operate the valve opener.

3. An air delivery gauge comprising a casing having a chamber therein provided with a fluid discharge opening, a stem in the casing having a fluid admission passageway to the chamber, a normally closed valve for controlling the passage of fluid through said passageway, said stem having a slot therein, a valve opener mounted in the slot and having a projection in position to open the valve, a bellows having an end portion attached to the stem and the opposite end portion movable in response to the withdrawal of fluid from the chamber, a sleeve actuated by the movable end portion and in position to operate the valve opener, and a regulating bellows mounted in the chamber in position to initially move the movable end portion of the first-mentioned bellows to cause an opening of the air admission valve.

4. An air delivery gauge comprising a casing having a chamber provided with a fluid discharge opening, a stem in the casing having a fluid passageway therethrough to the chamber, a spring-pressed valve normally closing said passageway for controlling the admission of fluid under pressure to the chamber, said stem having a slot therein, a valve opener mounted in the slot and having a projection in position to engage the valve to open it, a holding bellows having an end portion fixed to the stem and the opposite end portion movable relative thereto, said bellows having a restricted opening thereinto, and a sleeve actuated by the movable end portion for operating the valve opener.

5. An air delivery gauge comprising a casing having a chamber provided with a fluid discharge opening, a stem in the casing having a fluid passageway therethrough to the chamber, a spring-pressed valve normally closing said passageway for controlling the admission of fluid under pressure to the chamber, said stem having a slot therein, a valve opener mounted in the slot and having a projection in position to engage the valve to open it, a holding bellows having an end portion fixed to the stem and the opposite end portion movable relative thereto, said bellows having a restricted opening thereinto, a sleeve actuated by the movable end portion for operating the valve opener, a regulating bellows mounted in the chamber and having a movable end portion in position to initially press inward on the movable end portion of the holding bellows in response to withdrawal of fluid from the chamber, and means for adjusting the position of the regulating bellows in the chamber to regulate the actuation of the valve.

6. An air delivery gauge comprising a casing having a chamber therein, a valve arranged to control the fluid pressure in said chamber, a valve opener arranged to move the valve, a bellows mounted in the chamber and having movable and fixed end portions, and a sleeve about said bellows and having operative relation with the movable end portion and the valve opener to move the latter by movement of the movable end portion.

7. An air delivery gauge comprising a casing having a chamber therein, a valve arranged to control the fluid pressure in said chamber, a valve opener arranged to move the valve, a bellows mounted in the chamber and having movable and fixed end portions, and a sleeve surmounting the bellows and interposed between the movable end portion thereof and the valve opener for actuating the latter from the movable end portion.

8. In an air delivery gauge, the combination of a casing having a chamber therein provided with a fluid inlet and a separate fluid outlet for admitting fluid to and discharging said fluid from the chamber, an expansible bellows mounted in said chamber and having a movable end portion, a second expansible bellows mounted in the chamber and having a movable end portion, both of said bellows being arranged in the chamber and acted on by the fluid admitted to the chamber, means actuated by the movable end portion of one of said bellows for controlling the fluid inlet, and the other bellows having means separate from said controlling means for initially directly moving said last-mentioned movable end portion.

9. In an air delivery gauge, the combination of a casing having a chamber therein provided with a fluid inlet and a separate fluid outlet for admitting fluid to and discharging said fluid from the chamber, an expansible bellows mounted in said chamber and having a movable end portion, a second expansible bellows mounted in the chamber and having a movable end portion, both of said bellows being arranged in the chamber with the external portions thereof acted on by the fluid admitted through the inlet, means actuated by the movable end portion of one of said bellows for controlling the fluid inlet, and the other bellows being constructed for expansion upon withdrawal of fluid from the chamber and having means separate from the controlling means for initially moving said last-mentioned movable end portion to control the fluid inlet.

10. In an air delivery gauge, the combination of a casing having a chamber therein provided with a fluid inlet and a separate fluid outlet for admitting fluid to and discharging said fluid from the chamber, an expansible bellows mounted in the chamber and having fixed and movable end portions, means externally of said bellows and actuated by the movable end portion thereof for controlling the fluid inlet, a second expansible bellows mounted in the chamber and having fixed and movable end portions, said last-mentioned bellows being constructed for expansion upon withdrawal of fluid from the chamber and initially moving the movable end portion of the first-mentioned bellows, thereby to cause movement of the controlling means to open the inlet, both of said bellows being arranged in the chamber and acted on by the fluid admitted through the inlet.

JAMES HARRIS HARDY.